United States Patent [19]

Mainstone et al.

[11] Patent Number: 5,006,056
[45] Date of Patent: Apr. 9, 1991

[54] FILM EXTRUSION APPARATUS INCLUDING A QUICKLY REPLACEABLE CHILL ROLL

[75] Inventors: Kenneth A. Mainstone, Cincinnati, Ohio; Robert F. Moeller, Baldwinsville, N.Y.

[73] Assignee: The Black Clawson Company, Middletown, Ohio

[21] Appl. No.: 548,441

[22] Filed: Jul. 5, 1990

Related U.S. Application Data

[63] Continuation of Ser. No. 403,231, Sep. 1, 1989, abandoned.

[51] Int. Cl.$^5$ .............................................. B29C 47/88
[52] U.S. Cl. ..................................... 425/186; 118/69;
118/325; 156/244.24; 156/500; 425/190;
425/194; 425/325
[58] Field of Search ................. 425/62, 182, 185, 186,
425/190, 194, 325, 507, 327, 520, 328, 382.3,
133.5, 113, 114; 264/210.2; 156/244.24, 500;
118/69, 324, 325

[56] References Cited

U.S. PATENT DOCUMENTS

| | | | |
|---|---|---|---|
| 2,831,611 | 4/1958 | Collings et al. | 425/185 X |
| 3,421,964 | 1/1969 | Arbit | 425/325 X |
| 3,852,387 | 12/1974 | Bortnick et al. | 264/210.2 X |
| 4,157,235 | 6/1979 | Lagabe et al. | 425/325 X |
| 4,247,276 | 1/1981 | Phipps | 425/325 |
| 4,354,814 | 10/1982 | Grimminger et al. | 425/190 X |
| 4,408,974 | 10/1983 | Comerio | 425/194 |
| 4,409,173 | 10/1983 | Padovani | 425/325 X |
| 4,481,158 | 11/1984 | Georlette et al. | 264/210.2 X |
| 4,784,596 | 11/1988 | Heise | 425/186 |
| 4,874,571 | 10/1989 | Muller | 425/325 X |

FOREIGN PATENT DOCUMENTS 174055 8/1986 Japan ........................... 156/244.24

OTHER PUBLICATIONS

Black-Clawson Company Brochures 87-10-6059 through 87-10-6063, undated, Fulton, N.Y. 13069.

Primary Examiner—Richard L. Chiesa
Attorney, Agent, or Firm—Biebel, French & Nauman

[57] ABSTRACT

In extrusion apparatus for producing a continuous film of thermoplastic material, either as part of an extrusion coating or laminating process or to cast a continuous film, a chill roll which receives the film directly from the extruder is mounted on a wheeled carriage whereon it can be moved lengthwise into and out of operating relation with the other components of the apparatus without requiring lifting thereof or of other parts of the apparatus. The carriage may be proportioned to move directly between the apparatus in which it is to be used and the floor of the mill, or it may be mounted on a separate wheeled cart on which it is transported to and from the extrusion apparatus. Particularly in the latter case, provision is made for both vertical and lateral adjustment of the base structure on which the carriage is supported in its operating relation with the extruder.

9 Claims, 4 Drawing Sheets

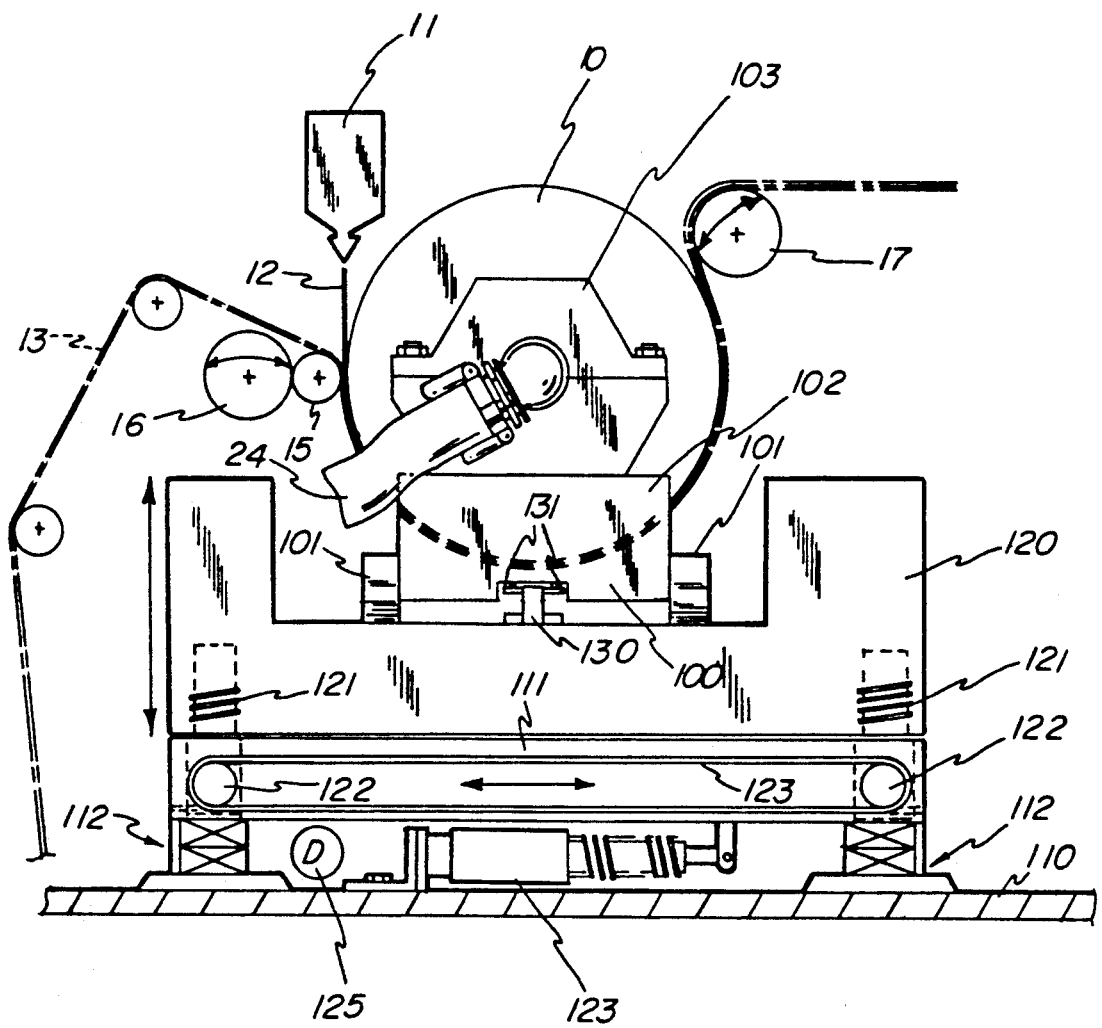

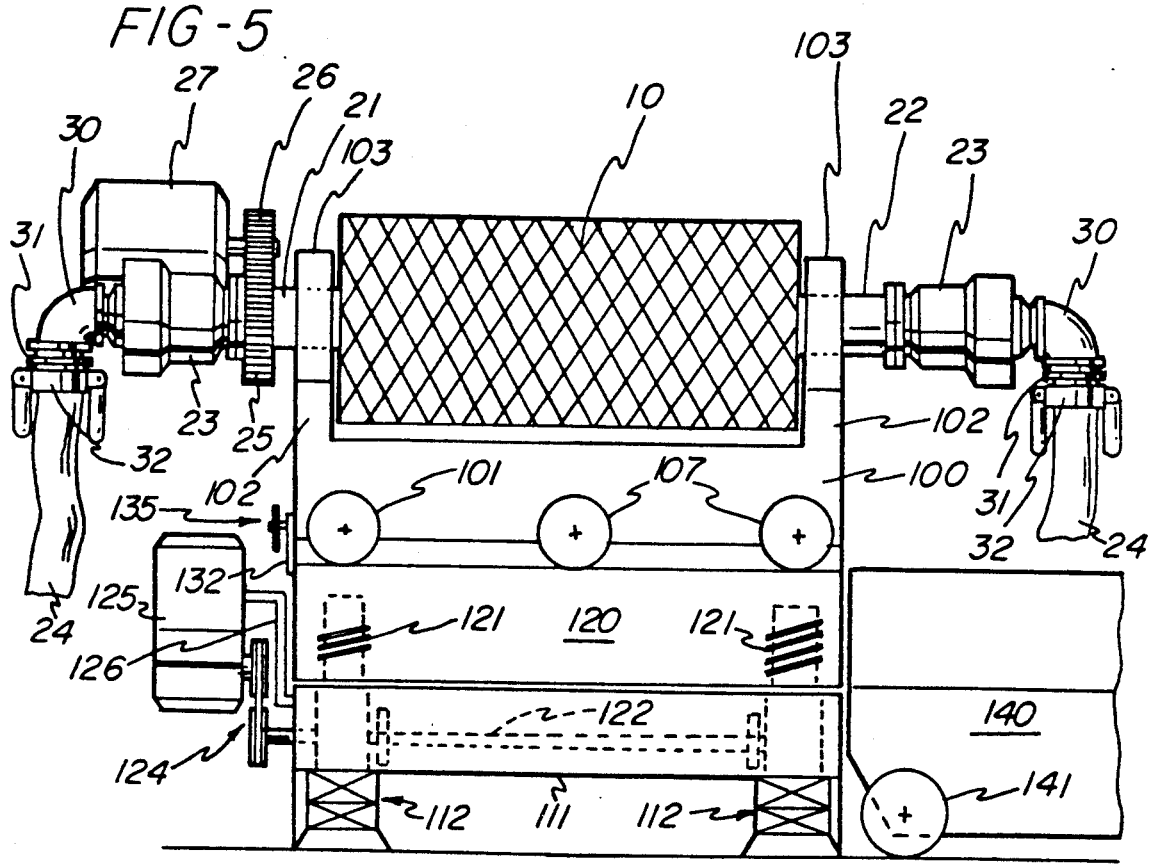
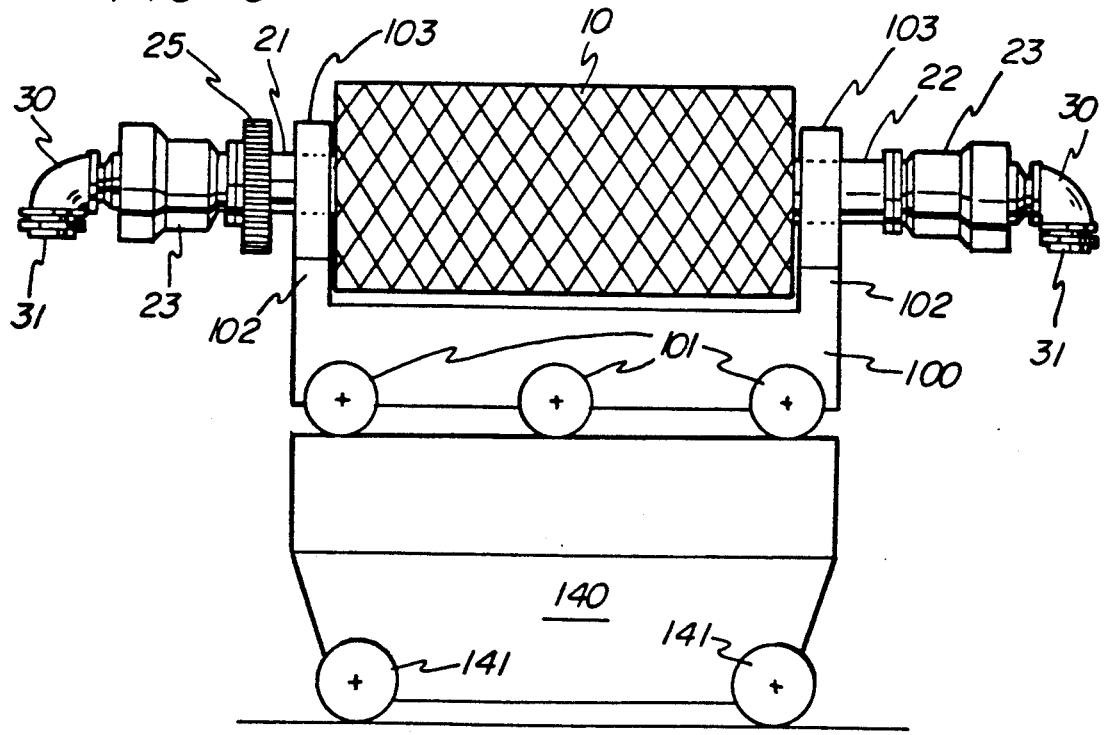

FILM EXTRUSION APPARATUS INCLUDING A QUICKLY REPLACEABLE CHILL ROLL

This is a continuation of co-pending U.S. application Ser. No. 403,231, filed Sept. 1, 1989, and now abandoned.

BACKGROUND OF THE INVENTION

In conventional apparatus for producing a continuous film of thermoplastic material, either as part of an extrusion coating or laminating process or to cast a continuous film, it is essential that the film be chilled as promptly as possible in order to maintain its extruded dimensions if it is to remain an independent film, or to set it in bonded relation to a web or between webs if it is used as a coating or adhesive layer. This is conventionally effected by extruding the film directly onto the surface of a drum-type roll which is hollow, and therefore includes hollow journals, so that a coolant (water) can be continuously circulated therethrough.

Such a chill roll is the largest, the heaviest, the most expensive and the most easily damaged component in the entire line of related apparatus. Its surface characteristics are critical to the quality of the plastic film whenever that film is used as a coating or as a separate product, and it therefore has a highly polished surface finish, which may be either chrome plated, matte finished, or provided with an embossed surface to be reproduced on the film. It is therefore of great importance that this surface be provided with maximum protection against injury, such as is most likely to occur during removal and replacement of the chill roll.

As an example of the practical problems involved in the handling of chill rolls, the assignee of this invention manufactures chill rolls as large as 36 and 40 inches in diameter, which have face widths as large as 180 inches, and which weigh as much as 10,000 pounds. Prior to the present invention, however, all apparatus known to the assignee thereof which incorporate chill rolls have no provision for the handling of such roll during removal and replacement except by means of an overhead crane and chain hoists. Such technique, however, involves high risks of damaging the roll surface, especially as the roll is being lifted away from or lowered back into its operating position and may therefore very easily swing into contact with associated parts of the apparatus.

SUMMARY OF THE INVENTION

In accordance with the present invention, the problems incident to the handling of chill rolls as outlined above are successfully eliminated by mounting each chill roll on its own movable base which is separate from but becomes effectively a part of a main base of the extrusion apparatus when the roll is in use.

Thus in one embodiment of the invention, the separate base for the chill roll is in effect a flat bedded carriage having its own supporting wheels or other rollers, and having a support adjacent each end for a conventional bearing stand, such as a pillow block bearing, for supporting the hollow journals of the chill roll. This carriage is so proportioned that it can be rolled directly into the extrusion apparatus with the chill roll supported thereon with its journals in line with the drive by which it is rotated in operation, e.g. a gear which forms part of the power train on the main frame and which meshes with a spur gear on the chill roll journal at the drive side of the apparatus.

With this embodiment of the invention, whenever the chill roll is to be removed and replaced, it is merely necessary to release the connections between the coolant circulating system and the rotary unions on the chill roll journals, release whatever latching mechanism is provided between the carriage and the main frame, and roll the carriage and chill roll out of the frame lengthwise of the roll, without requiring that the roll be lifted or otherwise handled in such manner as to be in danger of bumping its surface against any other structure.

In the preferred practice of the invention, whenever a chill roll is to be removed, the replacement thereof is already available, mounted on its own supporting carriage and having on the ends of its journals hydraulic coupling members matching those on the roll to be removed. Replacement is quickly and easily effected by rolling the carriage supporting the new roll into position, and the carriage is so proportioned that it will automatically present the drive end of the roll in line with the gear or other driving member with which it is to be engaged. The carriage is then locked into position, the inlet and outlet couplings for coolant are reconnected, and the apparatus is ready to resume production.

In another embodiment of the invention, the carriage which forms the base for the chill roll is constructed and proportioned for mounting on a supporting carriage by which it is carried to and away from the extrusion apparatus with which it is used. In this embodiment, the extrusion apparatus incorporates special base structure for receiving the roll-supporting carriage, and this base structure is constructed and arranged for vertical and/or horizontal adjusting movement with respect to the extrusion apparatus in order to establish a desired specific position of the chill roll with respect to an extruder.

Specific means by which the primary objectives of the invention are achieved, as well as other objects and advantages of the invention, will be apparent from or pointed out in connection with the description of the preferred embodiment which follows.

BRIEF DESCRIPTION OF THE DRAWINGS

FIG. 4 is a view similar to FIG. 1 illustrating a second embodiment of the invention wherein the carriage supporting the chill roll is adjustable vertically and laterally with respect to the extrusion apparatus;

FIG. 5 is a view looking from left to right in FIG. 4, with parts removed for greater clarity; and FIG. 6 is a view in side elevation showing the chill roll of FIGS. 4 and 5 as it is supported away from the extrusion apparatus.

DESCRIPTION OF THE PREFERRED EMBODIMENT

Figure 1:
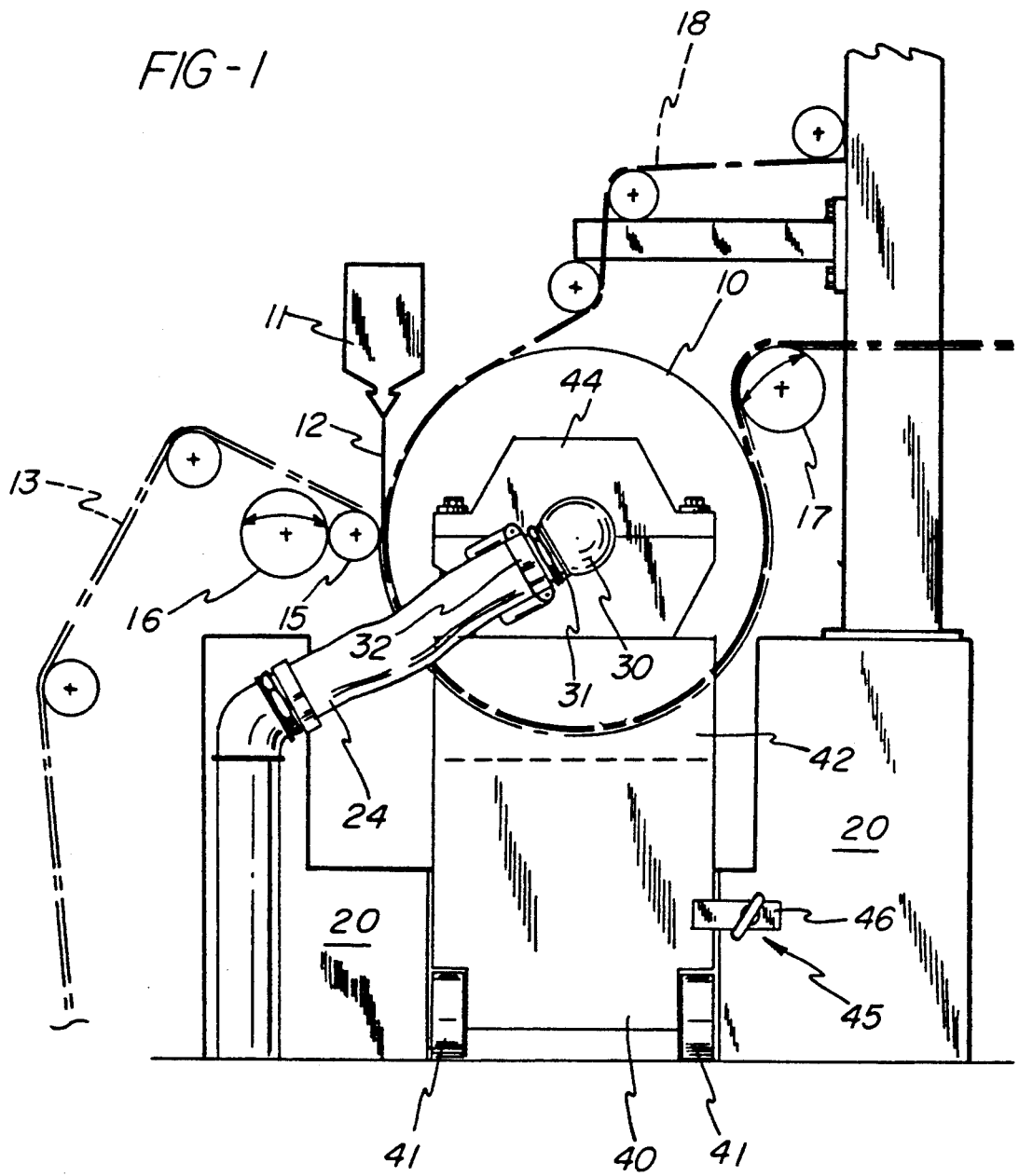
FIG. 1 is a somewhat diagrammatic elevation of the front side of an extrusion coater incorporating an embodiment of the invention.

The extrusion coating apparatus shown in FIG. 1 includes a chill roll 10 cooperating with an extruder 11 to apply a film 12 of thermoplastic material, e.g. polyethylene, to a preformed web 13, e.g. milk carriage or foodboard stock. The web 13 is fed to the chill roll 10 around a nip roll 15 backed by an adjustable pressure roll 16 so that it presses the web against the surface of roll 10. The extruder 11 is positioned to deliver the extruded film 12 into the nip of rolls 10 and 15, and the thus coated web wraps a major portion of the chill roll 10, with the film 12 in contact with the chilled roll surface, and is then guided away therefrom over an adjustable guide roll 17.

It is to be understood that essentially the same apparatus could be used to cast the film 12 as a separate film, by omitting the web 13. Or it could be used as an extrusion laminator to bond the web 13 to a second web 18 which is guided by a suitable series of rolls to the nip of rolls 10 and 15 from above roll 10, as indicated in broken lines in FIG. 1, with the film 12 then being delivered to the nip between the webs 13 and 18.

In conventional apparatus of the type shown in FIG. 1, the permanent structure which forms the main frame for the apparatus, and which is indicated generally at 20 in FIG. 1, includes the bearing supports for the journals 21 and 22 at opposite ends of the chill roll 10. These journals are necessarily hollow, because they are connected through rotary unions 23 to the system for circulating coolant liquid (water) through the chill roll by way of coolant lines 24.

The journal 21 at the drive side of the apparatus is directly connected to the drive by which it is rotated in operation, as represented by the driven gear 25 on journal 21 and the drive gear 26 and drive motor 27 mounted on frame 20. Each of the rotary unions 23 is equipped at its outer end with means by which it can be quickly connected to and disconnected from the coolant lines, such means being shown as an elbow 30 fitted at its outer end with one of the components 31 of a quickly releasable coupling having a complementary component 32 on the end of the associated coolant line 24.

In the conventional apparatus with which the present invention is concerned, when it is desired to change the chill roll 10, the couplings 31-32 must be disconnected, the bearings supporting the journals 21 and 22 must be released, the overhead crane must be moved to the proper position, the chain hoists depending therefrom must be positioned around the chill roll journals, and the roll is then ready to be lifted out of position and moved away. After it is unloaded, the replacement chill roll must be picked up, carried to the proper location above the apparatus, lowered into position, and connected up for use.

This is the period during which there is maximum danger of damage to the chill roll, but not the only danger. Necessarily, if the roll requires cleaning, polishing or other treatment while it is not in use, provision must be made for transporting it, again by crane, to the station where it is to receive treatment. Even if no treatment is needed and the roll is simply being exchanged for one having other surface characteristics, special provision must be made for storing the removed roll until it is to be returned to operation. All such handling and storage operations create danger of damage to the roll when they are carried out according to conventional practice as summarized above.

It should also be noted that because of the care with which this removal operation must be carried out in order to protect against damage to the roll, considerable time is needed for the operation, including the time initially required to move out of the way any other components of the apparatus which lie above the chill roll, such as the extruder and/or the guide rolls for the second web in a laminating operation. Further, unless the mill has a second crane capable of servicing the same apparatus, the replacement roll cannot even be brought to the apparatus until the crane has unloaded the removed roll, and then the replacement must be handled as carefully as was the removal. The result is therefore a very substantial period of down time for the entire line in which the extruder and chill roll are incorporated.

The present invention eliminates these problems by supporting each chill roll 10 in its own movable base, in the form of a wheeled carriage 40, both during operation in combination with an extruder, and also during removal and replacement of the chill roll as well as, if desired, during all necessary refinishing operations and storage. The carriage 40 is shown as provided with wheels 41 on which it can be rolled about the floor as needed, and adjacent each end thereof, it is provided with standards 42 on which are mounted bearing assemblies 44, shown as pillow-block bearings, capable of supporting the chill roll journals under all normal working conditions. In view of the weight that this carriage must carry, it may be advantageous to provide it with its own motorized drive, or it may be towed or pushed by a suitable tractor.

The height of the carriage 40, including the bearing assemblies 44, is preferably calibrated to support the chill roll with its journals at the proper level for engagement of a gear 25 on its journal 21 with a drive gear 26 supported on the frame 20. The carriage 40 is also provided with releasable means 45 for latching it to the frame 20, such as a threaded rod secured on the frame which is received through a bracket 46 on the carriage 40 and secured thereto by a wing nut. Such latching means can be located on both sides of carriage 40 and establishes the operative position for the carriage and the chill roll thereon in the frame 20.

In the practice of the invention, after the carriage carrying a chill roll has been rolled into position and latched, the apparatus will operate in the same manner as in conventional practice wherein a chill roll is mounted in bearing supports which are permanent parts of the frame. When it is to be removed and replaced, all that is necessary is to disconnect the couplings 31-32, retract the nip and pressure rolls 15 and 16 from the chill roll, release the latched connection or connections 45 between the frame 20 and carriage 40, and roll the carriage out of the apparatus in line with the operating position of the chill roll until the roll is clear of the other parts of the apparatus.

In order to reduce to a minimum the time for exchanging chill rolls, the replacement roll should already be standing by on its own carriage 40. Then as soon as the first roll is clear of the apparatus, the replacement roll can be rolled into position, thereby effecting engagement of its gear 25 with the drive on frame 20, the couplings 31-32 are attached, and the apparatus is ready to resume operation with minimum down time. Again, except for the nip and pressure rolls 15 and 16, no other parts need to be moved, and the exchange can therefore be completed while the removed roll is still being transported on its carriage 40 to the station where it is to be refinished or stored.

In the practice of the invention, the same carriage 40 can serve both as the transport vehicle for conveying a chill roll away from or to the apparatus in which it is used, and also to support the chill roll while the apparatus is in operation. It is possible and practical, however, to practice the invention using a pair of carriages or carts for each chill roll, one of which acts as the transport vehicle along the mill floor, while the other acts as a cradle constructed to be carried on the first carriage and to roll therefrom into operating position on the frame 10. Such a dual movable base, as shown in FIGS. 4–6, is particularly advantageous in conjunction with extrusion apparatus requiring a variety of operating positions for the chill roll, as when the apparatus includes more than one extruder, or when the web lead to the chill roll may come from either side thereof.

Figure 2:
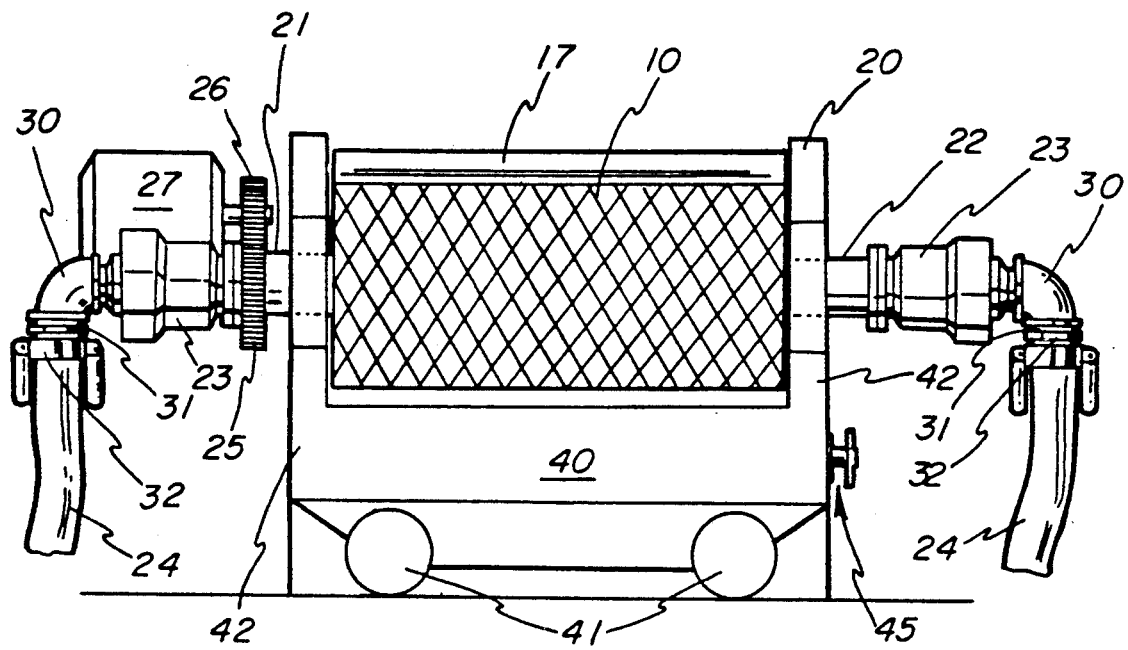
FIG. 2 is a view looking from left to right in FIG. 1, with parts removed for greater clarity.
Figure 3:
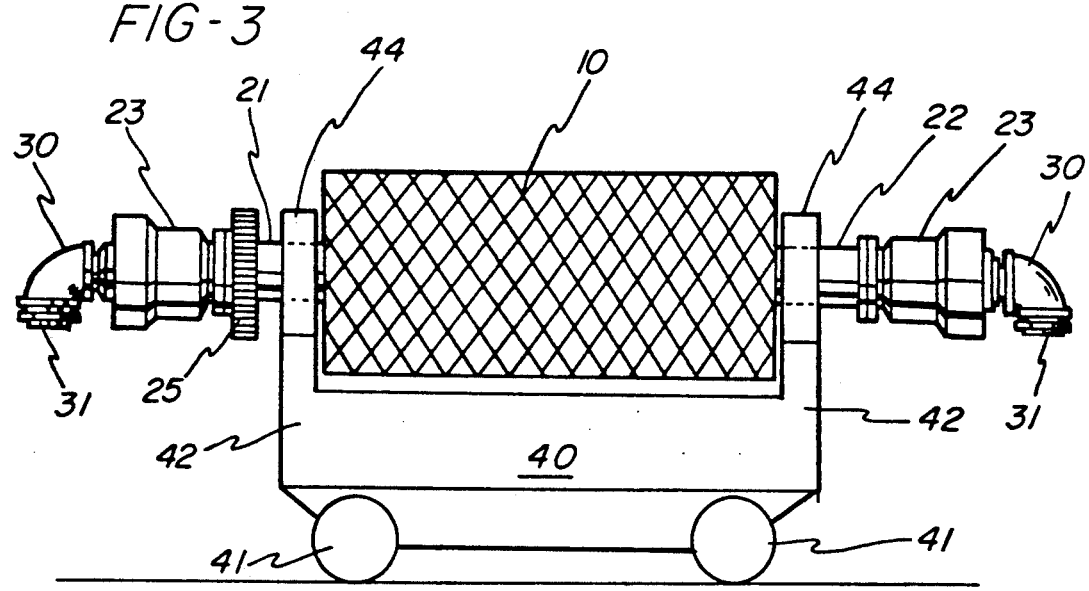
FIG. 3 is a view in side elevation showing a chill roll mounted on its supporting carriage away from the extrusion coater with which it is used.

Referring to FIGS. 4–6, wherein certain of the parts are identified by the same reference numbers as in FIGS. 1–3, the chill roll 10 is mounted on a carriage 100 having wheels 101 or other rollers and provided at its ends with stands 102 on which in turn are mounted the bearing assemblies 103 supporting the hollow journals 21 and 22 of roll 10. When this chill roll 10 is in use, it remains on the carriage 100, and this carriage is supported in the extrusion apparatus for such vertical and/or horizontal adjustment as may be needed or desired to maintain it in a precisely adjusted position with respect to the extruder 11 and/or parts of the apparatus.

More specifically, the frame of the extrusion apparatus includes a main base 110 which is secured to the floor. A supplemental base 111 is mounted on the base 110 by means of linear bearings 112 on which it can be horizontally adjusted, laterally as viewed in FIG. 4, by any suitable means such as a jack mechanism 113 having a drive 115 which may be a motor or a handwheel and transmission. It is to be understood that the linear bearings 112 may be of whatever length is necessary to provide for the extent of lateral movement of the chill roll which is required in a particular installation.

More specifically, it may be desired in a particular case to provide for lateral movement of the chill roll equal to its diameter so that it will be on the other side of the extruder 11. Adjustment to that extent would be desired, for example, in order to apply the film 12 to the opposite side of the web 13, in which case the web could be passed under the supplemental base 111 and then upward and around a nip roll mounted on the opposite of roll 10 from the nip roll 15 in FIG. 4.

A platform 120 mounted for vertical adjustment on the supplemental base 111 forms the direct support for the chill roll and its carriage 100 in use. Vertical adjustment of platform 120 may be by any suitable mechanical or hydraulic jack mechanisms, as indicated by a screw jack 121 connected between the supplemental base 110 and the platform 120 adjacent each corner of platform 120. Preferably all four of the jacks 121 are operated simultaneously by a common drive represented by a pair of shafts 122 connected by a drive chain 123 and driven through a chain drive 124 by a motor 125 mounted in any convenient manner on the supplemental base 111, as identified by a bracket 126.

Means are needed for maintaining the carriage in proper alignment on the platform 120 with the other components of the extrusion and laminating apparatus. An example of such means is shown in FIG. 4 as a rail 130 which is mounted on the platform 120 and is straddled by a pair of rollers 131 mounted on vertical axes adjacent each end of the carriage 100. Also some means are needed for latching the carriage 100 to the platform 120; e.g. a bracket 132 on platform 120 can serve both as a stop for carriage 100 and to receive a threaded rod on the carriage which is then locked thereto by a wing nut, as indicated at 135 in FIG. 5.

The supplemental base 111 and platform 120 which provide for horizontal and vertical adjustment of the chill roll 10 extend to a substantial height above the mill floor. A separate cart 140 having its own wheels 141 may therefore be provided to support the carriage 100 and chill roll 10 during removal and replacement of the chill roll and for transport thereof around the mill. This cart 140 should be of a height to support the carriage 100 at a level within the range of vertical adjustment of the platform 120, and like the carriage 40, it may incorporate its own motorized drive. Also provision should be made for releasably securing the carriage 100 to the cart 140, as by means like the parts 135.

In the use of this embodiment of the invention, the coolant line couplings 31 and 32 are disconnected either before or after an empty cart 140 has been positioned at the operator's side of the apparatus, as shown in FIG. 5, the platform 120 is adjusted vertically to a level matching that of the cart 140, and the carriage 100 is then rolled off the platform onto the cart 140 and taken away. The replacement chill roll, which should be standing by on its own carriage and cart, is then rolled up into line with the extrusion apparatus, preferably after any necessary lateral adjustment of the supplemental base 111, and the carriage is rolled onto the platform 120 and latched thereto. Then whatever vertical adjustments are necessary can be made, either before or after reconnecting the couplings 31–32, and the apparatus is ready to resume operation.

The practice of the invention is particularly advantageous when a major lateral adjustment of the chill roll is needed, such as in the above example wherein the roll is to be moved from one side to the other of the extruder. If in this example the chill roll is not to be replaced, it could simply be disconnected and withdrawn from the other apparatus, the supplemental base 111 could then be shifted appropriately, and the chill roll then reinstalled. In this way, no adjustment would be necessary for the extruder itself, even though in operation, it depends to a level below the top of the chill roll.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. In extrusion apparatus for producing a continuous film of thermoplastic material which includes a main frame, a chill roll having hollow journals at each end thereof, drive means for said chill roll including a drive member on said frame and a complementary drive member on one of said journals, means for coupling said journals to a system for circulating liquid coolant through said chill roll, and means for extruding a film of thermoplastic material onto and into wrapping engagement with said chill roll, the combination of:
    (a) a movable base for said chill roll which is separate from said frame and includes bearing means for directly supporting said chill roll journals,
    (b) means defining an operating position of said chill roll with respect to said extruding means,
    (c) means supporting said base for rolling movement lengthwise of said chill roll into and out of said operating position to expedite removal and replacement of said chill roll without requiring lifting thereof, (d) means effective with said chill roll in said operating position thereof for connecting said drive members, and (e) releasable means for securing said movable base in fixed relation with said frame.

2. The combination defined in claim 1 wherein said supporting means includes roller means which support said base during movement thereof off and into said frame.

3. The combination defined in claim 1 wherein said base is defined by a carriage, and said supporting means are wheels on said carriage.

4. The combination defined in claim 1 wherein said main frame includes a platform proportioned to receive said carriage, and further comprising means supporting said platform for vertical movement with respect to said frame.

5. The combination defined in claim 1 wherein said main frame includes a fixed base, a supplemental base mounted for lateral movement on said fixed base with respect to said extruding means, and a platform constructed and arranged to receive and hold said carriage with said chill roll thereon, and further comprising means supporting said platform for vertical movement with respect to said supplemental base.

6. Extrusion apparatus for producing a continuous film of thermoplastic material, comprising:

(a) means defining a main frame, (b) a chill roll having hollow journals at both ends thereof, (c) a movable base for said chill roll which is separate from said frame, (d) bearing means on said base for directly supporting said chill roll journals, (e) means supporting said base for rolling movement toward and away from said frame, (f) means in said frame defining an operative position for said movable base and said chill roll supported thereon, (g) complementary drive means on said frame and one of said journals effective to complete a driving connection to said chill roll with said base and said chill roll into said operative position thereof, (h) means effective in said operative position of said chill roll for coupling said journals to a system for circulating liquid coolant through said chill roll, and (i) means effective in said operative position of said chill roll for extruding a film of thermoplastic material onto and into wrapping engagement with said chill roll, (j) whereby said chill roll may be replaced by disconnecting said coupling means, rolling said base away from said frame, rolling a similar base and replacement chill roll into said operative position thereof, and connecting said coupling means to said journals of said replacement chill roll.

7. Extrusion apparatus as defined in claim 6 wherein said base is defined by a carriage, and said supporting means are wheels on said carriage.

8. Extrusion apparatus as defined in claim 6 wherein said main frame includes a fixed base having said extruding means mounted thereon, a supplemental base mounted for movement on said main base laterally of said extruding means, and a platform mounted for vertical adjustment on said supplemental base, and further wherein said movable base for said chill roll comprises a wheeled carriage, and said platform includes means for receiving and retaining said carriage thereon in said operative position thereof.

9. In extrusion apparatus for producing a continuous film of thermoplastic material which includes a main frame, a chill roll having hollow journals at each end thereof, drive means for said chill roll including a drive member on said frame and a complementary drive member on one of said journals, means for coupling said journals to a system for circulating liquid coolant through said chill roll, and means mounted on said main frame for extruding a film of thermoplastic material onto and into wrapping engagement with said chill roll, apparatus for effecting rapid removal and replacement of said chill roll, comprising:

(a) means forming a base fixed with relation to said frame, (b) a supplemental base mounted for movement on said fixed base laterally of said extruding means, (c) a platform mounted for vertical adjustment on said supplemental base, (d) a wheeled carriage including bearing means for directly supporting said chill roll journals, (e) means on said platform for receiving and retaining said carriage with said chill roll in a predetermined operating position thereof with respect to said extruding means, and (f) a wheeled cart proportioned to receive said carriage thereon at a level within the range of vertical adjustment of said platform, (g) whereby upon positioning said cart in juxtaposition with said platform, said carriage can be transferred from said platform to said cart and replaced by a second said chill roll supported on a second said carriage and cart upon alignment of said cart with said platform and movement of said carriage therefrom onto said platform.

* * * * *